UNITED STATES PATENT OFFICE 2,547,868

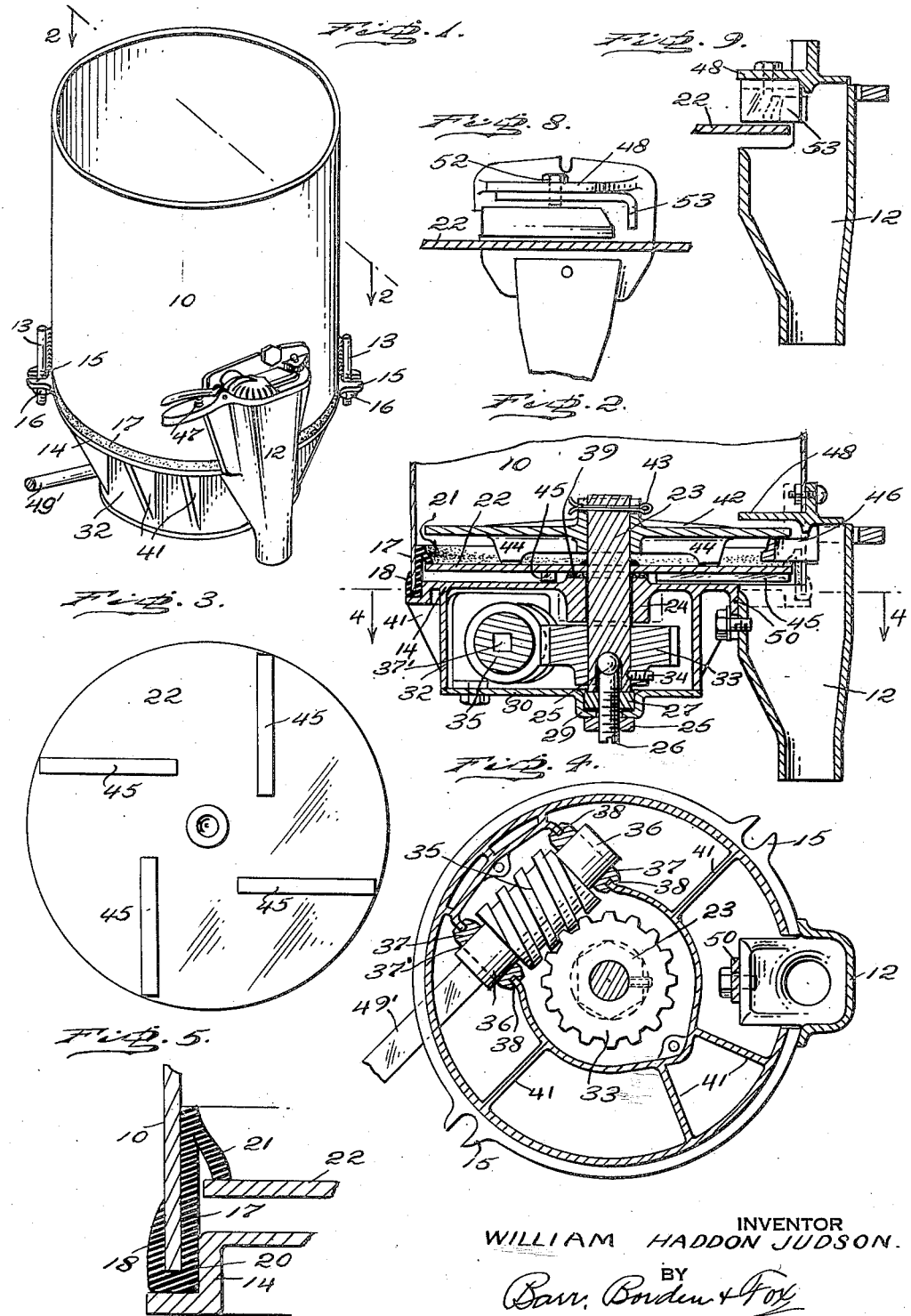
April 3, 1951 — W. H. JUDSON — 2,547,868
MATERIAL DISTRIBUTOR
Filed Nov. 8, 1949 — 2 Sheets-Sheet 1
INVENTOR
WILLIAM HADDON JUDSON
BY
Barr, Borden & Fox
ATTORNEY

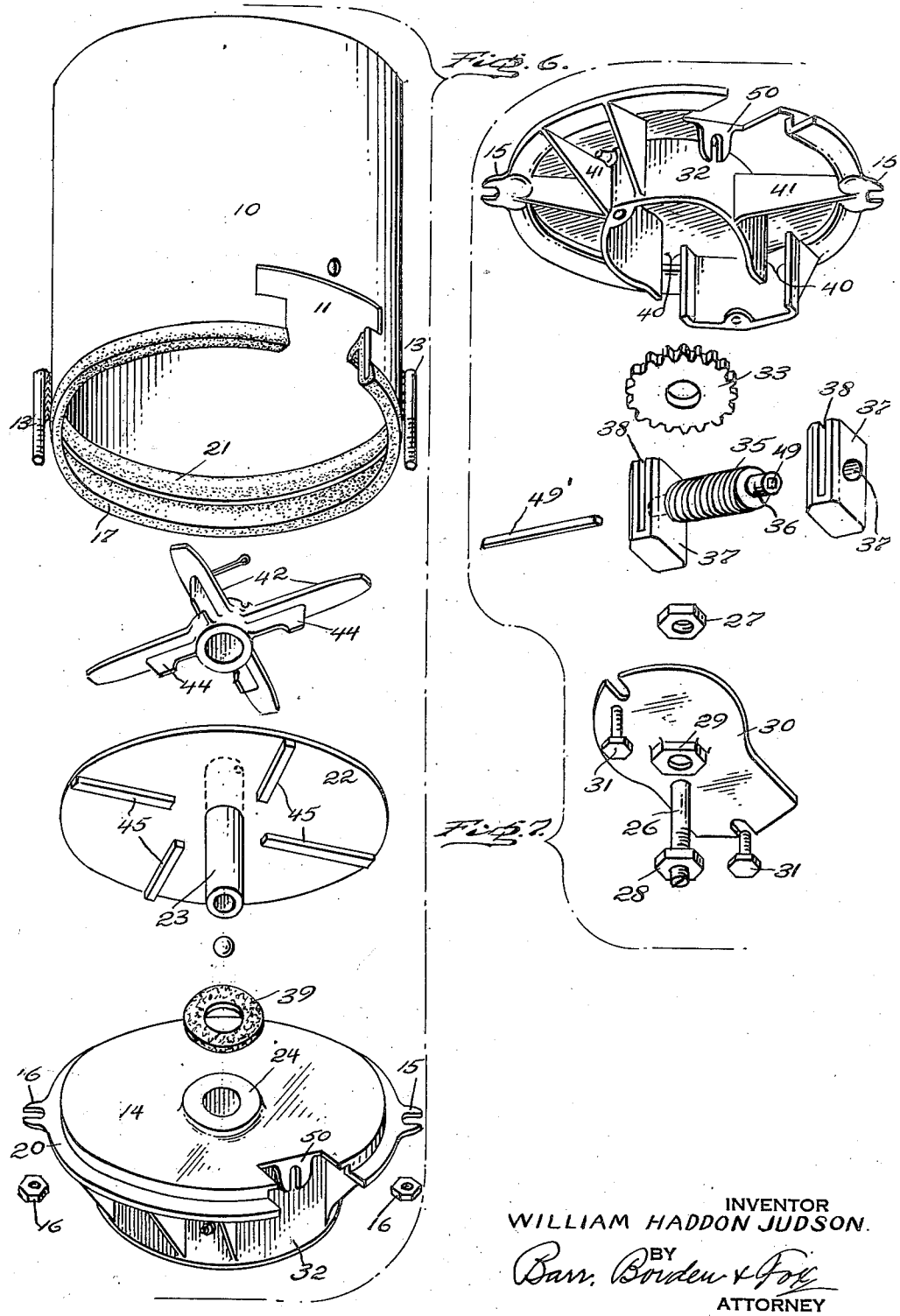

MATERIAL DISTRIBUTOR

William Haddon Judson, Wayne, Pa., assignor to Charles A. Judson, Philadelphia, Pa.

Application November 8, 1949, Serial No. 126,212

3 Claims. (Cl. 222—239)

The present invention relates to agricultural equipment and more particularly to a mechanism for distributing fertilizer, seed and other material, the same being an improvement upon the type of apparatus shown in applicant's pending applications Ser. No. 12,643, filed March 2, 1948, and Ser. No. 60,576, filed November 17, 1948, now abandoned.

Some of the objects of the present invention are to provide an improved material distributor for fertilizer, seed, or the like; to provide a distributor wherein the parts are arranged in association for ease in assembling, taking apart for repairs, and the replacement in a minimum of time; to provide a novel inter-related material distributing mechanism and driving unit of simple construction, relatively few parts, and efficient in operation; to provide a novel sealing means for confining the material within the distributing mechanism while preventing the material from working into moving parts; to provide a novel gear box structure for fertilizer distributing mechanism; to provide means in a material distributor for scavenging and removing material improperly reaching parts of the mechanism; to provide a novel guard for association with a distributor for preventing overflow of excess material when distributing predetermined amounts of material; and to provide other improvements as will hereinafter appear.

In the accompanying drawings, Fig. 1 represents a perspective of a material distributing unit embodying one form of the present invention; Fig. 2 represents a section on line 2—2 of Fig. 1, partly broken away and on an enlarged scale; Fig. 3 represents a bottom plan of the rotatable table for supporting the material and showing the arrangement of the scavenging ribs; Fig. 4 represents a section on line 4—4 of Fig. 2; Fig. 5 represents a sectional detail of the sealing ring assembly; Fig. 6 represents an exploded showing of the hopper and distributing elements; Fig. 7 represents an exploded showing of the closure for the bottom of the hopper and its associated distributor driving elements; Fig. 8 represents a detail in side elevation showing a modification of the invention; and Fig. 9 represents a front elevation of the parts shown in Fig. 8.

Referring to the drawings, a tubular hopper 10 serves as a reservoir for material to be distributed and is formed at its lower end with a T-shaped notch 11, which provides a discharge outlet for the material leading to a discharge spout 12. At two diametrically opposite locations adjacent the lower end of the hopper 10, two threaded bolt shanks 13 are welded respectively to the sides of the hopper so that the threaded ends thereof project below the bottom edge of the hopper. These shanks 13 serve as supports for the bottom closure 14, which is provided with two slotted lugs 15 diametrically opposite to respectively straddle the threaded shanks 13 and then receive clamping and supporting nuts 16. By this construction the closure can be quickly fixed in position or removed as a unit for access to the parts assembled therewith.

For the purpose of sealing the joint between the hopper 10 and its closure 14, a ring gasket 17 of rubber or other suitable material is provided, the same having a reversely turned edge flange 18 to lie in spaced relation to the body of the ring in order to fit snugly in gripping relation to the lower end of the hopper 10. The closure 14 is circumferentially cut away to form a seat 20 for the gasket 17. The opposite or upper end of the gasket 17 is formed with an inwardly and downwardly disposed circumferential flange 21 arranged to bear upon the upper face of the rotatable circular disc table 22 by which the material is supported and conveyed to the discharge notch 11.

For transmitting motion to the table 22, it is centrally apertured to receive a stub shaft 23 and to which it is welded annularly at a place between the ends of the shaft 23. The lower projecting end of the shaft 23 passes through a centrally disposed hub 24 on the closure 14 and terminates in a step ball bearing 25 capable of adjustment through the medium of a threaded member 26, feed nut 27 and lock nut 28. The feed nut 27 seats non-rotatably in a seat formed by an offset 29 on the bottom of a plate lid 30 which is removably fastened in place by studs 31 and serves as a closure for a gear box 32, here shown as an integral depending part of the closure 14. A gear 33 is made fast to the shaft 23, preferably by a set screw 34 and is in mesh with a worm 35, the end trunnions 36 of which have bearings respectively in bearing blocks 37.

In order to mount the moving parts for ready removal, repair or replacement, each block 37 is formed with vertically disposed side slots 38 arranged for telescopic connection to the gear box 32 by providing the wall of the latter with two alined vertical slots 40, the respective pairs of sides of which form guides by means of which each block 37 is slid into place, it being understood that the slots 40 are each of less width than the width of the cooperating block, so that the blocks 37 fit snugly in place in the slotted wall of the gear box. The blocks 37 are provided with an axially disposed bore 37' to rotatably support the trunnions of the worm 35. Turning of the worm is accomplished by providing axially located square holes 49 in the trunnions 36 to receive the squared end of a driven shaft 49 which projects through the gear box for attachment to a driving means. Where a series of distributors are used, supplemental shafts can be interfitted between the units as a continuation of the shaft 49'. Exteriorly the gear box 32 is reinforced by webs 41 cast integral therewith.

As a means for agitating the material upon the table 22 the projecting upper end of the stub shaft 23 has a spider 42 fixed thereto, preferably by means of a cotter pin 43 for ease in assembling. The bottom of each spider arm is formed with a pusher blade 44 radiating from the hub of the spider and having a downwardly disposed nose, which in assembled condition of the parts has a clearance from the top face of the table 22. Preferably a dirt-excluding washer 39 is interposed between the closure hub 24 and the table 22 as a protection for the parts within the gear box.

For the purpose of maintaining the top of the bottom closure 14 free from material which might improperly collect therein, the bottom face of the table 22 is provided with centrally offset ribs 45 terminating in close proximity to the edge of the table and having a thickness approximately equal to the spacing between the table and the closure 14, so that as the table rotates these ribs sweep or scavenge any material to the discharge outlet 11.

In order to regulate the material discharge, the outlet spout 12 (which is bolted to the hopper in proper relation to the outlet 11), carries a pivoted valve 46 riding through the outlet 11 and controlled by spring latch control lever 47. Also, the spout 12 carries a breaker plate 48 projecting into the hopper to lie in a plane just above the rotatable spider 42. Thus, any lumps of material carried by the table will be broken up as propelled against the said plate 48. As shown, the spout 12 is bolted at its upper end to the hopper and again to an ear 50 formed as a part of the gear box 32.

It will now be apparent that a novel material distributor has been invented wherein all the parts coact to produce an efficient assembly of minimum parts so arranged and coordinated as to be quickly put together or taken apart for repair or replacement. As shown, one feature of assembly resides in the novel journalling of the driving means for the material conveying table, including telescopically mounted trunnion bearings for the worm which can be slipped into place without specific fastening means other than the attachment of the gear box cover plate. Furthermore, by the provision of an adjustable ball step bearing any lost motion due to wear can be taken up without dismantling any of the parts. Also, the provision of a sealing means between the hopper and its bottom overcomes a heretofore troublesome loss and leakage of material. Such sealing means also incorporates a seal around the margin of the material table to prevent leakage of material below the table where it could impair moving parts. This action is further guarded against by the provision of table controlled ribs for sweeping such leakage away from all moving parts.

In the form of the invention shown in Figs. 8 and 9, provision is made primarily for seeding purposes and the discharge of seeds without waste. To that end a removable guard is provided having a body portion 51 to seat against the under face of the breaker plate 48 where it is fixed in place by a bolt 52. The outer end of the portion 51 is downwardly turned to form a guard 53 terminating in close proximity to the top of the table 22. The width of the guard 53 is preferably the same as the length of the edge of the breaker plate 48 and consequently forms an effective barrier to excess seeds, which otherwise would be swept by the valve 46 into the discharge spout. When this form of the invention is to be used, the agitator spider 42 is removed by withdrawing the cotter pin 43 and lifting the spider off, so that proper space is available for the placing and attachment of the guard 53.

Having thus described my invention, I claim:

1. A material distributor comprising a tubular hopper having a discharge outlet, a rotatable table in said hopper for conveying material to said outlet, a ring gasket having a circumferential groove to seat the bottom end of said hopper, and an inwardly disposed circumferential flange to overlie the marginal edge of said table, a removable closure forming the bottom of said hopper, said closure having a circumferential seat for said gasket, means for attaching said closure to said hopper in gasket sealing relation, and means for rotating said table.

2. A material distributor comprising a hopper having a discharge outlet, a closure forming the bottom of said hopper, means for removably attaching said closure to said hopper, a table rotatably mounted in said hopper for conveying material to said outlet, a rotatable agitator above said table, a stub shaft welded to said table, means for transmitting motion of said shaft to said agitator, an open bottom gear box carried by said closure and having spaced vertical slots in the side thereof, slotted bearing blocks for telescopic assembly within said slots, a worm having trunnions mounted respectively in said bearings, a gear in mesh with said worm and fixed to said stub shaft, a removable cover plate for the bottom of said gear box, a ball step bearing carried by said plate for supporting said stub shaft, and means for actuating said worm.

3. A material distributor comprising a hopper having a discharge outlet, a closure forming the bottom of said hopper, means for removably attaching said closure to said hopper, a table rotatably mounted in said hopper for conveying material to said outlet, ribs on the bottom of said table for sweeping the upper face of said closure, a rotatable agitator above said table, a stub shaft welded to said table, means for transmitting motion of said shaft to said agitator, an open bottom gear box carried by said closure and having spaced vertical slots in the side thereof, slotted bearing blocks for telescopic assembly within said slots, a worm having trunnions mounted respectively in said bearings, a gear in mesh with said worm and fixed to said stub shaft, a removable cover plate for the bottom of said gear box, a ball step bearing carried by said plate for supporting said stub shaft, and means for actuating said worm.

WILLIAM HADDON JUDSON.

REFERENCES CITED

The following references are of record in the file of this patent:

UNITED STATES PATENTS

| Number | Name | Date |
| --- | --- | --- |
| 200,490 | Underhill | Feb. 19, 1878 |
| 1,210,636 | Garst | Jan. 2, 1917 |
| 1,220,684 | Ray | Mar. 27, 1917 |
| 1,237,629 | Ford | Aug. 21, 1917 |
| 1,957,881 | Fouga | May 8, 1934 |
| 2,241,633 | Crose et al. | May 13, 1941 |
| 2,369,508 | White | Feb. 13, 1945 |